United States Patent
Bonnier et al.

(10) Patent No.: US 9,467,598 B2
(45) Date of Patent: Oct. 11, 2016

(54) METHOD, APPARATUS AND COMPUTER PROGRAM FOR ADAPTIVE BLACK POINT COMPENSATION

(75) Inventors: Nicolas P. M. F. Bonnier, Paris (FR); Jérôme O. R. Guermont, Gentilly (FR); Francis J. M. Schmitt, Paris (FR); Pamela Jeanette Schmitt, legal representative, Paris (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 1631 days.

(21) Appl. No.: 12/732,949

(22) Filed: Mar. 26, 2010

(65) Prior Publication Data
US 2010/0272353 A1     Oct. 28, 2010

Related U.S. Application Data

(63) Continuation of application No. PCT/EP2008/062915, filed on Sep. 26, 2008.

(30) Foreign Application Priority Data

Sep. 28, 2007  (EP) .................................... 07117464
Sep. 9, 2008   (EP) .................................... 08305538

(51) Int. Cl.
     *H04N 1/60*     (2006.01)
(52) U.S. Cl.
     CPC ................................ *H04N 1/6058* (2013.01)
(58) Field of Classification Search
     CPC .................................................... H04N 1/6058
     See application file for complete search history.

(56) References Cited

U.S. PATENT DOCUMENTS 5,608,548 A * 3/1997 Sobol ............................ 358/522
5,848,183 A   12/1998 Farrell (Continued)

FOREIGN PATENT DOCUMENTS

JP        2006-303984 A    11/2006
WO    WO 2007/095274 A2    8/2007

OTHER PUBLICATIONS

Meyer et al., "Color Gamut Matching for Hard Copy", SID International Symposium, May 16-18, 1989, Playa Del Rey, SID, US, vol. 20, pp. 86-89, XP000076842.

(Continued)

*Primary Examiner* — Vu Le
*Assistant Examiner* — Kenny Cese
(74) *Attorney, Agent, or Firm* — Birch, Stewart, Kolasch & Birch, LLP

(57) ABSTRACT

A system and method for carrying out improved spatial and color adaptive gamut mapping algorithms, based on image decomposition in two bands $I_{high}$ and $I_{low}$ using 5D bilateral filtering. A function g( ) applied to the low-pass band $I_{low}$ carries out black point compensation followed by a gamut clipping algorithm. Function k( ) applied to $I_{high}$ is a locally adaptive function. The merging and adaptive mapping of $I_{highM}$ and $I_{lowM}$ by function f( ) using local adaptive implementations of the two families of pointwise GMAs: compression and clipping is carried out. Two functions f( ) are proposed, they take into account the color properties of the neighborhood of each pixel. Black point compensation is adaptive by, in dependence of a histogram of the image, carrying out black point compensation if the number of pixels below the black point of the output device is more than a first threshold; carrying out partial black point compensation if the number of pixels below the black point of the output device is between the first and a second threshold and carrying out no black point compensation if the number of pixels below the black point is less than the second threshold.

16 Claims, 9 Drawing Sheets

(56) References Cited

U.S. PATENT DOCUMENTS

| | | |
|---|---|---|
| 6,618,171 B1 | 9/2003 | Tse et al. |
| 2003/0038957 A1* | 2/2003 | Sharman ............. 358/1.9 |
| 2005/0265625 A1* | 12/2005 | Li et al. ............. 382/274 |
| 2006/0182361 A1* | 8/2006 | Ptucha et al. ......... 382/254 |
| 2006/0238615 A1 | 10/2006 | Shigeta |
| 2006/0269125 A1* | 11/2006 | Kalevo et al. ......... 382/162 |
| 2007/0188780 A1* | 8/2007 | Edge ............. H04N 1/6058 358/1.9 |
| 2007/0291048 A1* | 12/2007 | Kerofsky ............. 345/589 |

OTHER PUBLICATIONS

Morovic, Jan et al; A Multi-Resolution, Full-Colour Spatial Gamut Mapping Algorithm; Hewlett Packard Company, Barcelona, Spain; Colour & Imaging Institute, University of Derby, Derby, United Kingdom; pp. 1-6.

* cited by examiner

Figure4: SCACOMP: p1 *offset* (j=1) contributes to the shifting of (p*ilow*+ $a^i$p*ihigh*)toward the 0 grey point, unlike p2*offset* (j=2).

Figure 5: SCACLIP: ($p_{low}^i + a^i p_{high}^i$) is mapped toward 3 directions, the optimal direction will be chosen so that the local variations are best maintained.

Figure 6: In modified SCACLIP the direction of projection of each pixel is selected to preserve as much as possible the vectors p*iin* p*jin*.

Fig.7
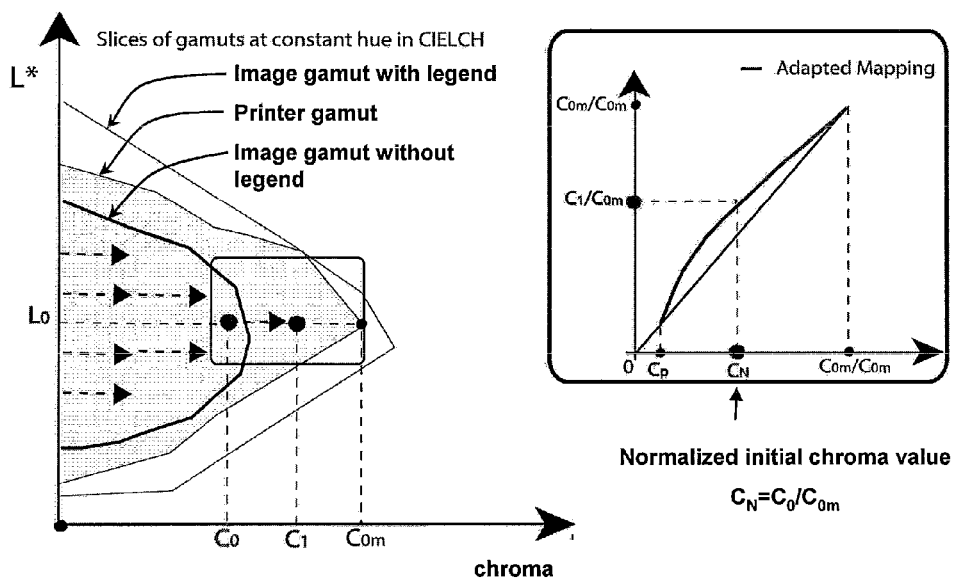
A
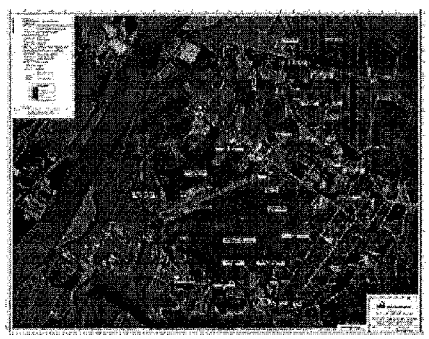
B
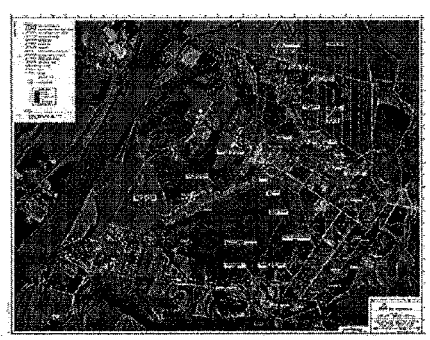

METHOD, APPARATUS AND COMPUTER PROGRAM FOR ADAPTIVE BLACK POINT COMPENSATION

CROSS-REFERENCE TO RELATED APPLICATIONS

This application is a Continuation of PCT/EP2008/062915 filed on Sep. 26, 2008, and claims priority under 35 U.S.C. §119(a) on Patent Application Nos. 07117464.3 and 08305538.4 filed in Europe on Sep. 28, 2007 and Sep. 9, 2008, respectively, all of which are hereby expressly incorporated by reference into the present application.

BACKGROUND OF THE INVENTION

1. Field of the Invention

The invention relates to a method for mapping an original image from a source gamut color subspace to a destination gamut color subspace belonging to a certain output device and having a certain black point, the method comprising a step of black point compensation. The invention also relates to a system for mapping an original image from a source gamut color subspace to a destination gamut color subspace belonging to a certain output device and having a certain black point comprising a filter for decomposing the original image in several bands, yielding at least a low pass image and a high pass image; and a black point compensation component. The invention further relates to a computer program for performing the method and a computer readable medium for carrying the program.

2. Description of Background Art

Gamut mapping algorithms consider an input device's color gamut and an output device's color gamut. Some gamut mapping algorithms are said to be adaptive when they also consider some of the image characteristics, such as the image type, histogram, contrast or gamut. Recent techniques consider the image layout and the spatial features. They keep track of the spatial features and try to preserve them in the rendering process. In the ICC workflow, the color conversion algorithm consults the ICC profiles of the two devices (the source device and destination device) and the user's rendering intent (or intent) in order to perform the conversion. Although ICC profiles specify how to convert the lightest level of white from the source device to the destination device, the profiles do not specify how black should be converted. The user observes the effect of this missing functionality in ICC profiles when a detailed black or dark space in an image is transformed into an undifferentiated black or dark space in the converted image. The detail in dark regions (called the shadow section) of the image can be lost in standard color conversion.

Adobe Systems implemented Black Point Compensation to address this conversion problem by adjusting for differences between the darkest level of black achievable on one device and the darkest level of black achievable on another.

Black Point Compensation (BPC) also referred to as linear XYZ scaling maps the source's black point to the destination's black point in the CIEXYZ color space, hence scaling intermediate color values.

Alternatively, a Lightness Compression Algorithm (LCA) also named lightness scaling, resealing or remapping might be applied to the image in the CIELAB color space. Linear, polynomial and sigmoidal LCAs have been proposed in the prior art and have been implemented in point-wise (i.e. non spatial) color workflows. Experimental results suggest that the performance of sigmoidal scaling depends on the magnitude of gamut difference and might be image-dependent. XYZ scaling is considered as a baseline color re-rendering for reasonably similar output-referred source and destination media. Most point-wise ICC workflow implementations apply linear CIEXYZ scaling (e.g. Adobe).

Lightness scaling is also proposed in existing spatial gamut mapping algorithms, e.g. a linear compression to the low spatial-frequency band in the log domain, or also an optional sigmoidal lowest spatial-frequency band. Similar techniques have also been used to render High Dynamic Range (HDR) images, where the range of the base layer is compressed using a scale factor in the log domain of the rgb pixel values.

In prior art systems it is known that a user makes the choice to select BPC or not in converting an image. BPC can be considered as a gamut compression algorithm. As such, it produces images that are less saturated. This desaturation is not always welcomed and/or necessary. The effect is dependent of the actual content of the image and of the gamut of the destination device. This implies that, each time the user wants to make a print out of an image he has to decide whether the conversion of a particular image looks better with or without BPC. The user is only able to judge this after having seen a print out of the image, since BPC is device dependent. Even a preview on a screen will not help him. This is cumbersome.

SUMMARY OF THE INVENTION

In order to overcome the above problems, the method according to the preamble is characterized in that the step of black point compensation is adaptive by, in dependence of a characteristic of the image, carrying out black point compensation if a value of the characteristic is more than a first threshold and carrying out no black point compensation if the value of the characteristic is less than or equal to the first threshold.

In this way it is possible by evaluating a characteristic of the image and comparing it with an appropriate threshold to decide if black point compensation is necessary for the actual image and given the black point of the device.

A next embodiment is characterized in that the characteristic is a histogram of the image and in that the value of the characteristic is the number of pixels below the black point of the output device.

By usage of a histogram it is possible to automatically decide whether to apply BPC based on the image histogram:
  If only the color of a few pixels (or less) is below the black point of the output device, BPC is not necessary.
  If the color of all the pixels of the image is below the black point of the output device, BPC is absolutely necessary.

According to the invention BPC will be applied to an image, on an image base, only, if large parts of the image are significantly below the level of the output black point of the device. The histogram might be direction dependent and it might also be a local histogram.

In a next embodiment the method is further improved in that carrying out black point compensation if the number of pixels below the black point of the output device is more than a first threshold comprises carrying out partial black point compensation if the number of pixels below the black point of the output device is between the first and a second threshold and carrying out full black point compensation if the number of pixels below the black point is more than the second threshold.

This provides for intermediate cases; in such case a partial BPC is applied. Partial BPC might be implemented as a linear combination between No BPC and BPC. However also non-linear combinations are possible.

In a further advantageous embodiment, the method further comprises the step of decomposing the image in images in several bands, resulting in at least a low pass image, where the step of black point compensation is carried out on the low pass image resulting in a black point compensated low pass image; and a step of gamut mapping applied on the black point compensated low pass image.

Since BPC in CIEXYZ scales down the gamut of the low pass image, gamut boundaries of the black point compensated image are closer to the destination gamut and clipping in a following gamut mapping step will have less impact on the final results. And this clipping by e.g. HPMinΔE is appropriate to preserve the saturation. Since BPC is part of a rendering workflow, the above shows that it is advantageous to apply BPC before gamut mapping: it avoids consequent clipping of low-key values in the image.

The invention further relates to a system for mapping an original image from a source gamut color subspace to a destination gamut color subspace belonging to a certain output device and having a certain black point comprising:

a filter for decomposing the original image in several bands, yielding at least a low pass image and a high pass image;

a black point compensation component, taking the low pass image as input and delivering a black point compensated low pass image as output; and an adaptive merging and mapping component for merging and mapping the black point compensated low pass image and the high pass image yielding an output image.

The invention also relates to a method for mapping an original image from a source gamut color subspace to a destination gamut color subspace belonging to a certain output device and having a certain black point, the method comprising step of carrying out black point compensation, wherein the step of black point compensation is adaptive by, in dependence of a histogram of the image, carrying out black point compensation if the number of pixels below the black point of the output device is more than a first threshold; carrying out partial black point compensation if the number of pixels below the black point of the output device is between the first and a second threshold and carrying out no black point compensation if the number of pixels below the black point is less than the second threshold.

The notion of image that is used in the appropriate cases refers to a set of pixels having values, where each value of a pixel has a value from a color subspace.

Regarding the notation of variables used in this application the following is remarked:

$I_{\overline{low}}$ is also indicated as $I_{lowM}$;
$I_{\overline{high}}$ is also indicated as $I_{highM}$;
in general the horizontal bar above a subscript corresponds with an extension of "M" indicating that the variable has been mapped;
L, C, h are also indicated with a star *; and
for variables the subscripts and superscripts are in cases indicated as normal characters following the main character of the variable: Ilow is identical to $I_{low}$.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 shows a further improvement in adapted mapping;

DESCRIPTION OF THE EMBODIMENTS

Framework

Figure 1:
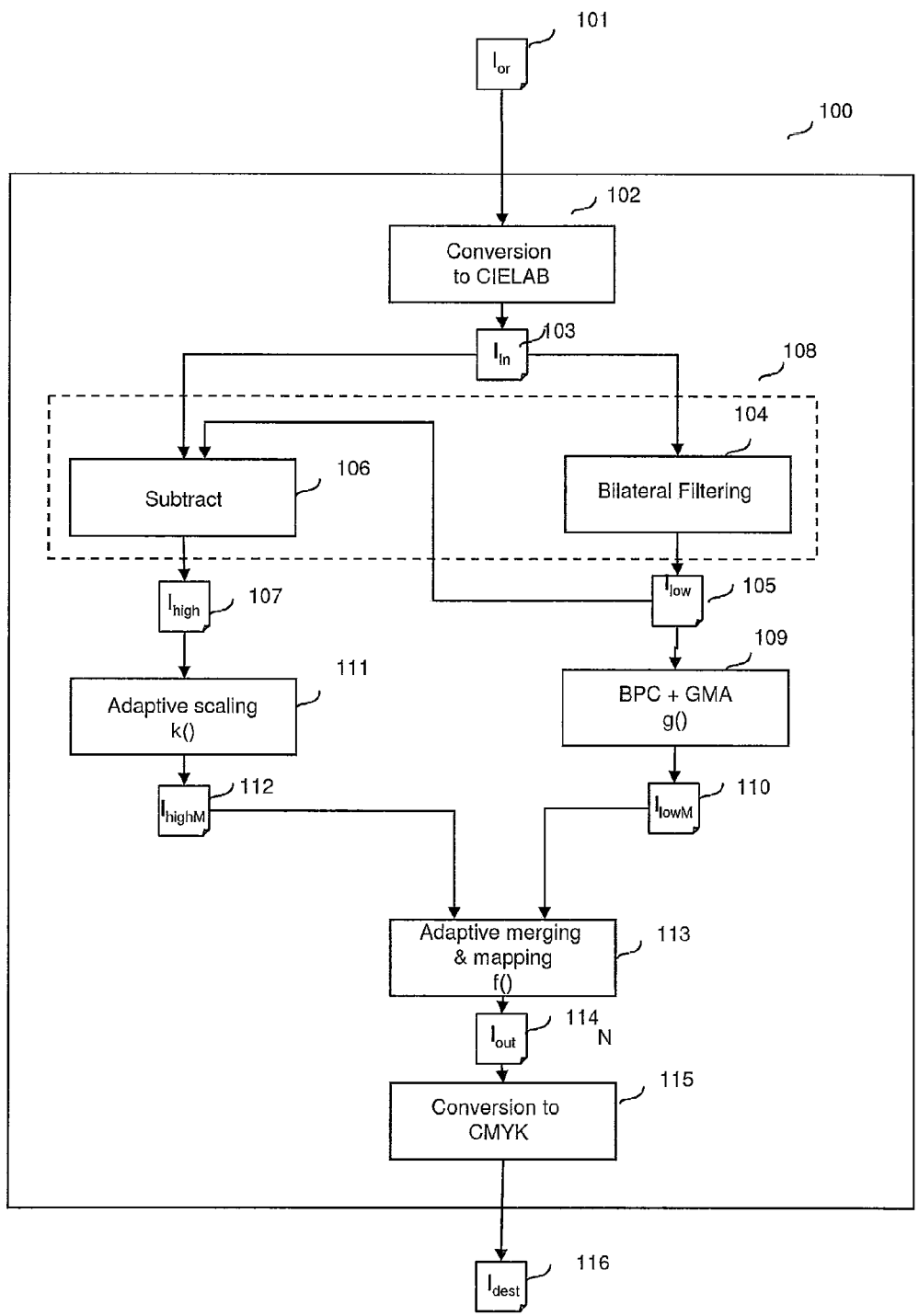
FIG. 1 shows a system for gamut mapping according to the invention.
Figure 2:
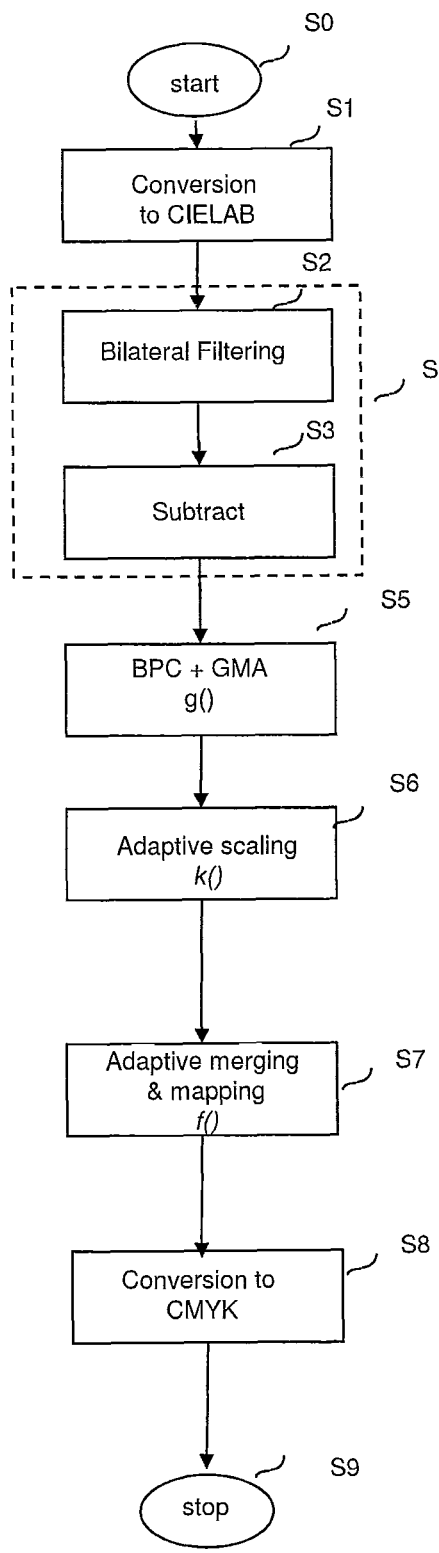
FIG. 2 shows a flow diagram representing an embodiment of a method according to the invention.

FIG. 1 illustrates a system 100 comprising a number of components making up a framework for adaptive gamut mapping according to the invention. In the framework images going from one component to another are indicated as a rectangular with a folded corner. The components, also referred to as modules, may be embodied as software components running under a certain operating system on a computer or they may be embodied in hardware as dedicated circuits like FPGLA's or the like. FIG. 2 provides a flow diagram representing an embodiment of a method according to the invention. Both diagrams are related in the sense that typically a particular component carries out a particular step of the method.

In step S1, executed by component 102, an original image $I_{or}$ (101) is converted to CIELAB color space, using the absolute intent of the input ICC profile and yielding $I_{in}$ (103).

In a next step S2, executed by component 104, a low pass band $I_{low}$ (105) is obtained from $I_{in}$ by Bilateral Filtering. In this step a weighted local mean is computed where each neighbor is given a weight, which is a function of both the geometric distance and the colorimetric $\Delta E_{ab}$ distance to the central pixel. This mean is computed using a five-dimensional bilateral filtering algorithm. The resulting low pass band $I_{low}$ (105) contains these weighted local means, where the weight is a function of both the geometric distance and the colorometric $\Delta E_{ab}$ distance to the central pixel.

In step S3, executed by component 106, the high pass band $I_{high}$ (107), comprising the local variations, is determined by taking the difference of $I_{in}$ and $I_{low}$.

Step S2 and S3 together, indicated as S4 and corresponding with modules 104 and 106, together indicated as 108, effectively decompose the image in several bands. In the embodiment illustrated so far the image is decomposed in two bands, one containing the local means, the other the local variations.

In a next step S5, corresponding with module 109, $I_{low}$ is mapped on the destination gamut DestGamut by clipping and Black Point Compensation is applied. This transformation will further be indicated by g( ). Note that degradation by clipping mostly occurs in a neighborhood in which several pixels have nearby color values. However the previous bilateral filtering in step S2 will prevent this: such a neighborhood will be blurred by the filter and the local variations will be safely preserved in $I_{high}$. This step provides as output $I_{lowM}$ (110).

In step S6, corresponding with module 111, a transformation k( ) is carried out on $I_{high}$ resulting in $I_{highM}$ (112).

In step S7, corresponding with module 113, a spatial and color adaptive gamut mapping algorithm is applied, further indicated as f( ). Due to the bilateral filtering carried out in step S2, the neighborhood of each pixel is taken into account in such a way that the color values of the pixels and their relations between neighbors are preserved. This yields $I_{out}$ (114).

Finally in step S8, corresponding with module 115, $I_{out}$ is converted to the CMYK encoding of the output printer using the relative colorimetric intent of its associated ICC profile. This yields $I_{dest}$ (116).

The application of this framework in a printing system will be discussed later.

The framework according to the invention will now be elaborated in more detail.

Color Space

In step S1 conversion to CIELAB is executed. It is noted that the color space in which a Spatial Gamut Mapping Algorithm is applied is of importance. In the embodiment presented CIELAB is chosen, however also CIEXYZ will be used.

Image Decomposition

The goal of the decomposition, carried out in module 108, is to set apart the local means and the local details of the image in order to process them separately and preserve both as much as possible in the resulting image. The framework presented decomposes the image in two bands, however by modification of module 108 the framework will be suited for n bands. The improvements in BPC and SCAGMAs are also suited to be applied with several bands.

Low Pass Filtering

Using Gaussian Filters for low pass filtering will result in halos. To avoid the introduction of halos, the decomposition is obtained by an edge preserving filter using 5D Bilateral Filtering (BF). The size of the filter is a crucial parameter and it will be discussed shortly. The number of frequency bands in the decomposition under consideration is 2, but may be more and a maximum will only be constrained by the cost of the computation time.

5D Bilateral Filtering (BF) in the CIELAB space is a combined spatial domain and color range filtering. Let $L_{BF}$=BF(L), $a_{BF}$=BF(a), $b_{BF}$=BF(b) denote the three channels of the filtered image. The $L_{BF}$ value of pixel i, $L^i_{BF}$, can be obtained as follows (similar expressions for $a^i_{BF}$ et $b^i_{BF}$):

$$L^{*i}_{BF} = \sum_{j \in I_{in}} w^j_{BF} L^{*j}$$

$$w^j_{BF} = \frac{d(x^i, x^j) r(p^i, p^j)}{\sum_{j \in I_{in}} d(x^i, x^j) r(p^i, p^j)}$$

where $I_{in}$, is the original image, $d(x^i, x^j)$ measures the geometric closeness between the locations $x^i$ of pixel i and $x^j$ of a nearby pixel j. $r(p^i, p^j)$ measures the colorimetric similarity between the colors ($L^i$, $a^i$, $b^i$) and ($L^j$, $a^j$, $b^j$) of pixels i and j.

In our implementation, $d(x^i, x^j)$ and $r(p^i, p^j)$ are gaussian functions of the Euclidean distance between their arguments:

$$d(x^i, x^j) = e^{-\frac{1}{2}\left(\frac{\|x^i - x^j\|}{\sigma_d}\right)^2},$$

$$r(p^i, p^j) = e^{-\frac{1}{2}\left(\frac{\Delta E^*_{ab}(p^i, p^j)}{\sigma_r}\right)^2}$$

where the two scale parameters $\sigma_d$ and $\sigma_r$ play an essential role in the behavior of the filter. These will discussed shortly. It is noted that equally parameters $\delta_d$ or $\delta_r$ may be used for characterization of the filter.

Figure 3:
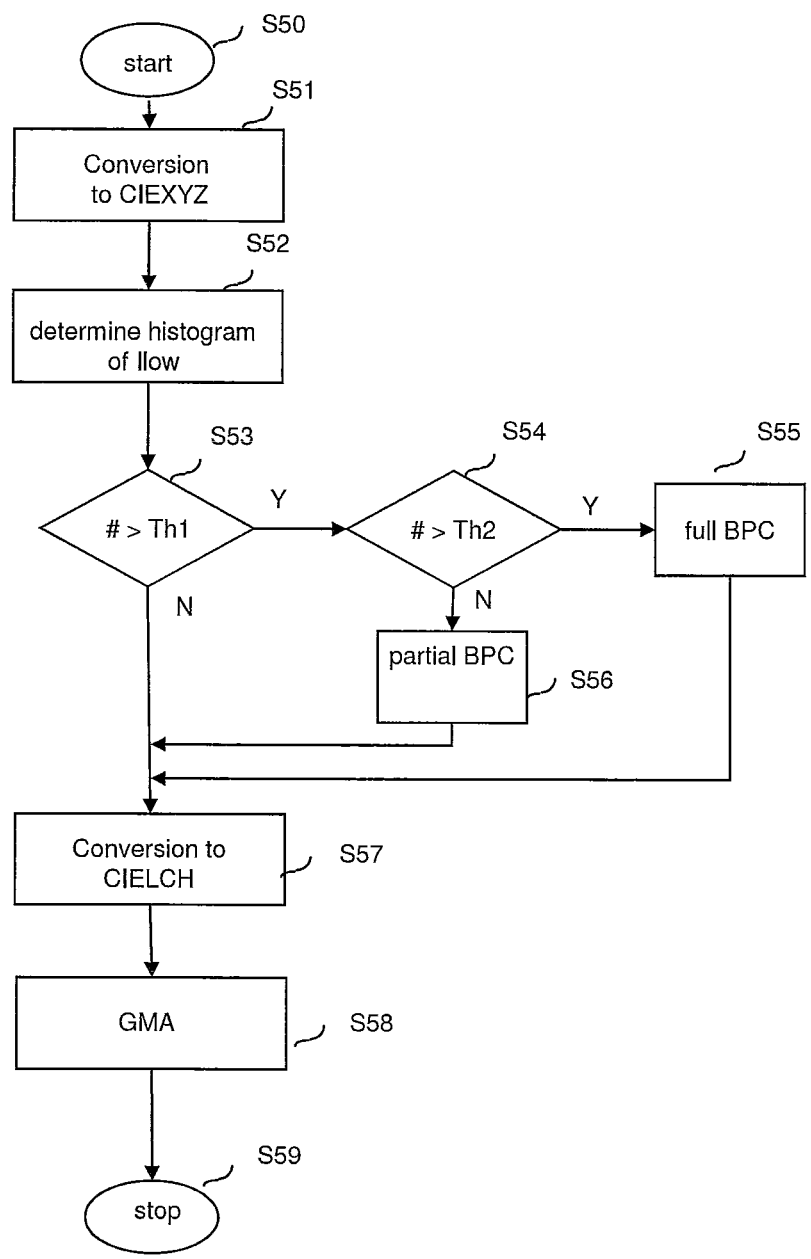
FIG. 3 shows a flow diagram for adaptive BPC.

For the decomposition in two bands according to the invention, first, the original CIELAB image is converted to the polar representation CIELCH, i.e. lightness, chroma and hue. To compute the low-pass band $I_{low}$ only the two channels $L_{in}$ and $C_{in}$ of the original image $I_{in}$ are filtered using 5D bilateral filtering. This is illustrated in FIG. 3. The $h_{in}$ channel is not filtered, to keep the hue unaltered by the proposed SGMA. Nevertheless, since the 5D bilateral filter involves $\Delta E_{ab}$ distance, the hue will be well taken into account in the filtering of $L_{in}$ and $c_{in}$ channels.

The low pass band $I_{low}$ is thus defined as:

$$I_{low} = (L_{BF}, c_{BF}, h_{in})$$

where $L_{BF}$=BF($L_{in}$) and $c_{BF}$=BF($c_{in}$).

Filter Parameters, Spatial Filter Size

In classic gaussian filtering, the width of the gaussian filter (set by $\sigma_d$) determines the boundary between the lower frequency content going to the low-pass band (considered as local means) and the higher frequency content going to the high-pass band (local details). Setting the appropriate value for $\sigma_d$ is not a trivial task. This choice relates to the definition of 'local details' (i.e. small or minor elements in a particular area). This definition depends on multiple parameters such as the size and resolution of the reproduction, the modulation transfer function of the reproduction device, the viewing conditions, the distance of visualization and the behavior of the human visual system. It is known in the art to model the human visual system by multi-scale decompositions with more than two bands (usually up to five). By applying this now in the framework according to the invention it allows for the definition of several categories of details with different sizes. For the embodiment presented, the image decomposition is limited to two bands. Appropriate values for $\sigma_d$ and $\sigma_r$ for this embodiment will be discussed now.

Filter Sizes in 5D Bilateral Filter

In the 5D bilateral filter the $\Delta E_{ab}$ color distance between the central pixel and nearby pixels is also taken into account. This allows us to avoid halos and to handle specifically the local transitions between local similar pixels. Nearby pixels at small $\Delta E_{ab}$ distance (i.e. perceived as similar) are filtered. Pixels are less and less filtered as the $\Delta E_{ab}$ distance becomes large compared to $\sigma_r$. Thus σr determines a reference to set apart small $\Delta E_{ab}$ from large $\Delta E_{ab}$. While small $\Delta E_{ab}$ values are well correlated with perceived color differences, it is more difficult to define a threshold σr above which $\Delta E_{ab}$ values can be considered as large. One goal of the SCAG-MAs is to preserve color differences that would otherwise be mapped by gamut mapping algorithms to the same color of the destination gamut. Thus to set $\sigma_r$, the average distance between the input and destination gamuts might be considered. The ability of the output device to maintain small differences between colors could also be taken into account.

Given the lack of a straightforward definition for 'local details' and 'similar colors', we propose to review the previous work and to evaluate the impact of σd and σr values on the image decomposition.

Experiments carried out by the inventor brought forward the following observations:

A larger value of σd means a broader filter in the image domain, thus a larger set of frequencies being filtered. Indeed considering a column of images with increasing σd going from top to bottom, when browsing the images from top to bottom, one observes that $I_{low}$ becomes blurrier and $I_{high}$ presents more and more details. A larger value of $\sigma_r$ means a larger filter in the color domain, thus a larger range of color transitions being filtered. When $\sigma_r$ is very large, the bilateral filter is not modulated by the color content of the filtered area and the resulting blurring of the image becomes similar to the blurring of a two dimensional gaussian filter. It also leads to the introduction of halos near the strong edges. Viewing a row of images with an increasing $\sigma_r$, one finds more and more color content in $I_{high}$.

We now consider the relation between $\sigma_d$ and $\sigma_r$. A small value of $\sigma_r$ severely limits the blurring of the image to very small color transitions for any $\sigma_d$. A small value of $\sigma_d$ limits the blurring of the image to high frequency content for any $\sigma_r$. When both $\sigma_d$ and $\sigma_r$ have very large values, $I_{low}$ shows some color shifts due to a large boost of chroma in desaturated areas surrounded by saturated areas. These would cause trouble in the gamut mapping process, yet it only occurs for very large σ values.

Based on our observations, we find the values $\sigma_r=20\,\Delta E_{ab}$ and $\sigma_d=20$ pixels (i.e. approximately 1.5% of the diagonal) to be a good compromise which suits these algorithms and a set of appropriate images.

Considering $\delta_d$ and $\delta_r$ as parameters, it is stated that the setting of $\delta_d$ should depend on the image size and the conditions of visualisation. In earlier experiments, we have set the values to $\delta_d=1\%$ of the image diagonal and $\delta_r=25\Delta E$ (for images printed at 150 dpi, at the size 9 cm-15 cm by 12 cm-20 cm, viewed at a distance of 60 cm).

In a particular embodiment these parameters, discussed above, may be set by a user via a user interface, or by a control program based on status and settings of the job and the system.

High Pass Filtering

The high pass band $I_{high}$ is then calculated in step S3, executed by module 106 in FIG. 1, by taking the difference of $I_{in}$ and the low pass $I_{low}$:

$$I_{high}=I_{in}-I_{low}=(L_{in}-L_{BF},c_{in}-c_{BF},0)$$

Function g( ) Applied to the Low Pass Band.

The step of applying Function g( ) to the low pass band (step S5, executed by module 109) will now be further elaborated.

Function g( ) acts on the local means of the input image $I_{in}$ contained in $I_{low}$. Its goal is to map the gamut of $I_{low}$ into the destination gamut $Gamut_{Destination}$, while preserving as much as possible the color attributes such as hue, lightness and chroma. It also needs to preserve global rendering.

In order to avoid consequent clipping of low-key values in the image Black Point Compensation (BPC) is applied on $I_{low}$.

In the following section an algorithm for inclusion in the framework and method according to the invention is proposed.

Black Point Compensation (BPC) also referred to as linear XYZ scaling maps the source's black point to the destination's black point in the CIEXYZ color space, hence scaling intermediate color values. It is noted that Black Point Compensation can be considered as a gamut compression algorithm. As such, it produces images that are less saturated. This desaturation is not always welcomed and/or necessary. The method proposed overcomes this disadvantage. The method for BPC will be explained now with reference to FIG. 3. FIG. 3 is an elaboration of step S5 in FIG. 2. In a first step S51 $I_{low}$ is converted to a normalized flat XYZ encoding with white point=[1,1,1]. In the next step S52 a histogram of $I_{low}$ is made up. Along the x-axis of the histogram the Y-values of $I_{low}$ run. Along the y-axis of the histogram the number of pixels having a given Y-value are indicated. On the horizontal axis also the minimum Y value of the Destination device $Y_{minDest}$ is indicated. From the histogram the total number of pixels, #, with a Y value below $Y_{minDest}$ is determined. Is this number above a first threshold Th1 (step S53, Y), in the next step S54 it is checked if this number is also above a second threshold Th2, where Th2>Th1. If so (step 54, Y) full black point compensation will be carried out (step S55).

For full BPC the $Y^i_{lowBPC}$ value of pixel i, $Y^i_{lowBPC}$, is obtained as follows (similar expressions for $X^i_{lowBPC}$ and $Z^i_{lowBPC}$):

$$Y^i_{lowBPC} = \frac{Y^i_{low} - Y_{minlow}}{1 - Y_{minlow}}(1 - Y_{minDest}) + Y_{minDest}$$

where $Y^i_{lowBPC}$ is the scaled Y value of the destination pixel i, $Y^i_{low}$ the Y value of the source pixel i, $Y_{minlow}$ the minimum Y value of the image and $Y_{minDest}$ the minimum Y value of the destination device.

If in step S54 it turns out that #>Th2 does not hold (N), partial BPC is carried out (step S56), where partial BPC is a linear combination between no BPC and full BPC, according to the next equation:

$$I_{lowBPCadaptive}=q*I_{low}+(1-q)*I_{lowBPC}$$

where q=#/(Th2−Th1).

In case in step S53 it turns out #>Th1 does not hold (N), meaning that only the color of a few pixels or less is below the black point of the output device, BPC is not necessary at all and will not be carried out. Thresholds Th1 and Th2 are parameters that can be set by an operator via a user interface on an apparatus.

The method will continue with S57, as also will happen after carrying out step S56 and after carrying out step S55, wherein the image resulting is converted to CIELCH.

After this conversion the method continues with step S58 where the low pass band obtained is further processed.

BPC significantly decrease the number of out of gamut pixels and the distance between the gamut and these pixels. Since the BPC in CIE XYZ scales down the gamut of $I_{low}$, boundaries of $I_{lowBPC}$'s gamut are closer to the destination gamut and the choice of initial clipping has less impact on the final results. In previous experiments some colorful images clipping artifacts were noticeable. These artifacts were due to the initial clipping using HPMinΔEab. However such artifacts are no longer an issue when applying the black point compensation first, and HPMinΔEab is appropriate to preserve the saturation: $I_{low}$=HPMin HPMinΔE($I_{LowBPC}$)

The second step of function g( ) is the gamut mapping of the low-pass band. The goal of this mapping is to preserve as much as possible the color of each pixel in $I_{low}$. Preserving the color distance between neighbors is not as critical as when mapping the whole $I_{in}$, since most of the important details of the decomposed image have been filtered by the 5D bilateral filter and lie in $I_{high}$. These constraints lead to the use of HPMinΔE after BPC resulting in the clipped image $I_{lowM}$ where:

$$I_{lowM}=HPMin\Delta E(IlowBPC)=g(I_{low}),$$

$$g=HPMin\Delta E \cdot BPC.$$

Note that the hue channel is left unaltered by HPMinΔE: $h_{lowM}=h_{low}=h_{in}$. Since the BPC in CIE XYZ scales down the gamut of $I_{low}$, boundaries of the gamut of $I_{lowBPC}$ are closer to the destination gamut and the choice of initial clipping has less impact on the final results. The choice of HPMinΔEab for gamut mapping is appropriate since it preserves the saturation and maintains the hue constant.

However in another embodiment (SCACOMP version) of our spatial and color adaptive GMA (see below function f( )), HPMinΔEab is substituted by another clipping algorithm SCLIP clipping toward the 50% grey point in order to apply consistent locally adaptive compression that would not be consistent if using HPMinΔEab:

$$I_{lowM}=SCLIP(I_{lowBPC})=g(I_{low}),$$

$$g=SCLIP \cdot BPC.$$

Function k( ) Applied to the High-Pass Band

The step of adaptive scaling, step S6 of FIG. 2, executed by module 111 of FIG. 1, will now be worked out further. When image areas of $I_{low}$ have been greatly modified into $I_{lowM}$ by the clipping, the local energy within $I_{lowM}$ may substantially be reduced compared to the local energy within $I_{low}$. In the image areas where both $I_{low}$ and $I_{high}$ have large local energies but $I_{lowM}$ has lost a part of its local energy, it might be wise to reduce the energy of $I_{high}$ to form $I_{highM}$ to maintain a balanced ratio between the contributions from the two bands $I_{lowM}$ and $I_{highM}$, similar to the ratio between $I_{low}$ and $I_{high}$. Therefore we introduce α(i, $I_{low}$, $I_{lowM}$) a local variable affecting the amount of thigh being added to $I_{lowM}$ during the merging at each pixel i:

$I_{highM}=\alpha.I_{high},$
or equivalently:

$$p^i_{\overline{high}} = \alpha^i \cdot p^i_{high},$$

$$\alpha^i = \min\left(\sum_{j \in lin} w^j_{BF} \frac{\|p^j_{low} - p^i_{low}\| + \varepsilon}{\|p^j_{low} - p^i_{low}\| + \varepsilon}, 1\right)$$

where ε is a small constant value to avoid dividing by zero if $p^j_{low}=p^i_{low}$ and $w^j_{BF}$ are the weights of the bilateral filter used in the decomposition of the image. Preferably ε=0.001.max(|plow|). α is taken into account in the modified versions of SCACOMP and SCACLIP. Notice that α is less critical when Black Point Compensation is applied to $I_{low}$ as the local structure of the low-pass band is then better preserved and α is often close to 1. In a particular situation α=1 and $I_{high}=I_{highM}$.

Adaptive Merging and Mapping of the Two Bands, Function f( )

The two bands $I_{low}$ and $I_{high}$ have been modified by g( ) and k( ) respectively, and at this point, $I_{lowM}$ and $I_{highM}$ can be merged and then mapped (step S7 and module 113).

In this step, the mapped low pass image $I_{lowM}$ and the high pass band image $I_{highM}$ are merged.

The merging operator is an addition, as simple as the decomposition operator:

$$I_{temp}=I_{lowM}+I_{highM}.$$

Although more elaborated merging is also possible, since function k performs as a locally dependent weight similar to that of an adaptive merging a simple addition for merging suffices for the framework presented.

Since colors in $I_{temp}$ might lie outside the destination gamut $Gamut_{Dest}$, a second gamut mapping is necessary. Unlike the mapping of $I_{low}$, this mapping needs to preserve details and should therefore adapt to the content of $I_{temp}$.

The bilateral filter (module 104, step S2) filters low color variations and maintains high color variations (i.e. strong edges). According to these properties, local spatial variations contained by $I_{highM}$ present only low color variations. Therefore, each pixel and its neighbors are more likely to be projected to a same little area of the gamut boundary if f( ) is a clipping GMA. This would result in a strong diminution of the variations present in $I_{high}$. To avoid this situation, f( ) and also k( ) may be locally adaptive functions with the following objectives for a pixel $p_{out}$ of the resulting image $I_{out}$:

$p_{out}$ is as close as possible to $p_{in}$ of $I_{in}$,
the color variations of $p_{out}$ with its neighbors are the closest to the color variations of $p_{in}$ with its neighbors,
$p_{out} \in Gamut_{Dest} \cap \wp$ (plane of constant hue $h_{in}$ of $p_{in}$).

Since the first two requirements might be antagonistic, $p_{out}$ results of a compromise. A weighted sum can be used here:

$$\begin{cases} p_{out} \in (Gamut_{Dest} \cap \wp), \\ p_{out} = \arg\min_p \left[ w\Delta_1(p, p_{in}) + (1-w)\Delta_2(p_{high}, p_{\overline{high}}) \right], \end{cases}$$

where w∈[0, 1] is a weight and Δ1, Δ2 are distance metrics (several metrics are available in this context).

If w=1, k becomes minimum Δ1 clipping (k=HPMinΔE if A=ΔE*ab).
If w=0, only the color variations between the pixel and its neighbors will be preserved, not the pixel value.
In intermediate cases w ∈]0, 1[, the result might be obtained by an optimization algorithm.

Fast solutions can be deployed to maintain the computational time at a reasonable level. A tradeoff of computation time versus quality of the result has to be taken into account. In the next sections, two alternative and fast embodiments are proposed that provide approximations of the best obtainable results. They are based on the same framework: decomposition in two bands $I_{high}$ and $I_{low}$ using 5D bilateral filtering, followed by a clipping of the low-pass band $I_{low}$ into $I_{lowM}$ and a locally adaptive scaling of $I_{high}$ into $I_{highM}$. Then $I_{highM}$ and $I_{lowM}$ are merged and adaptively mapped by using a local adaptive implementation of the two families of pointwise GMAs: compression and clipping.

Spatial and Color Adaptive Compression (SCACOMP)

Figure 4:
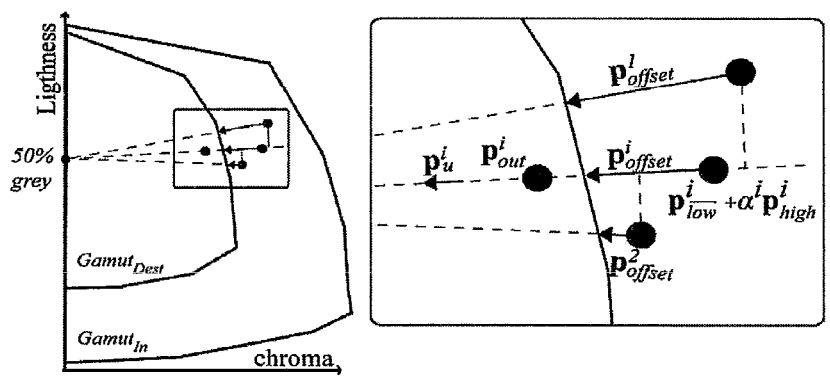
FIG. 4 shows an illustration of mapping according to a first embodiment.

According to a particular embodiment an adaptive compression algorithm to preserve the color variations between neighboring pixels contained by $I_{highM}$ is used. The concept is to project each pixel lying outside GamutDest toward the center, more or less deeply inside the gamut depending on its neighbors (FIG. 4).

First, $I_{highM}$ is added to $I_{lowM}$ and the sum $I_{temp}$ is mapped using SCLIP:

$$I_S=SCLIP(I_{temp})=SCLIP(I_{lowM}+I_{highM}).$$

Then we compute the difference Ioffset between $I_s$ and the newly constructed image $$I_{temp} = (I_{lowM} + I_{highM}):$$

$$I_{offset} = I^S - I_{temp} = I_S - (I_{lowM} + I_{highM}).$$

At the given spatial position $x^i$, for each pixel j in the neighborhood, we project the color vector $p^j_{offset}$ on the direction of $p^i_{offset}$. If the result is greater than the norm $\|p^i_{offset}\|$, $p^j$ is taken into account and pushes $p^i_s \in I_s$ toward the 50% grey point of GamutDest (FIG. 4). Each neighbor's contribution to the shifting of pixel i is weighted by $w^j_{BF}$ defined by the Bilateral Filter BF:

$$w^j_{BF} = \frac{r(x^i, x^j) s(p^i, p^j)}{\sum_{j \in I_{in}} (r(x^i, x^j) s(p^i, p^j))},$$

and $$p^i_{out} = (p^i_{\overline{low}} + p^i_{\overline{high}}) + w^i_{shift} p^i_{offset}$$

where:

$$w^i_{shift} = \sum_{j \in I_{in}} w^j_{BF} \max\left( \frac{p^j_{offset} \cdot p^i_{offset}}{\|p^i_{offset}\|^2}, 1 \right),$$

where "·" denotes the scalar product. $w^i_{shift}$ is superior or equal to 1, guaranteeing therefore that the resulting color value lies in the gamut, between the gamut boundary and the 50% grey point of $Gamut_{Dest}$.

In a variant of the embodiment of SCACOMP each neighbor's contribution is controlled by $w^i_{shift}$:

$$p_{out}^i = SCLIP(p_{\overline{low}}^i + \alpha^i p_{high}^i) + w^i_{shift} p_u^i$$

where $p^i_u$ is the unit vector toward 50% grey, $$w^i_{shift} = \sum_{j \in I_{in}} w^j_{BF} \max(p^j_{offset} \cdot p^i_u - |p^i_{offset}|, 0),$$

$$p^i_{offset} = SCLIP(p^i_{\overline{low}} + p^i_{\overline{high}}) - (p^i_{\overline{low}} + p^i_{\overline{high}})$$

and where "·" denotes the scalar product.

As $w^i_{shift} \geq 0$, the resulting color value lies in the gamut, between the gamut boundary and the 50% grey point of GamutDest. This variant prevents numerical imprecisions which could arise with very small values of $|p_{offset}|$.

Spatial And Ccolor Adaptive Clipping (SCACLIP)

According to a second embodiment, in order to maintain the content of Thigh, the direction of the projection is set as a variable: for each pixel the optimal mapping direction will be chosen so that the local variations are best maintained.

Figure 5:
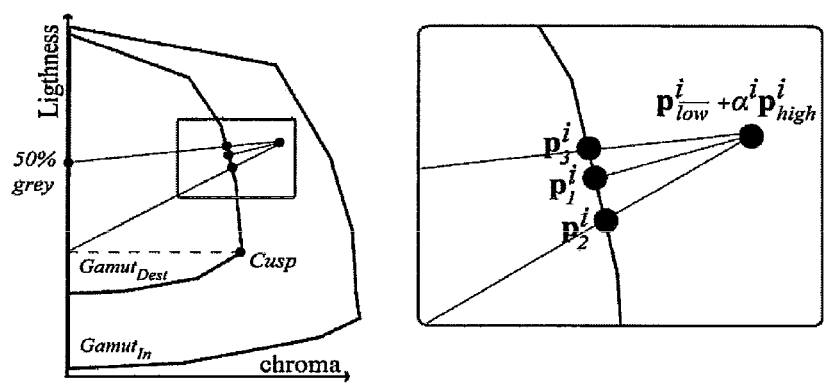
FIG. 5 shows an illustration of mapping according to a second embodiment.

To get faster results, the choice is restricted to a set of directions. In the proposed second embodiment, the mapping direction will be chosen within directions known in the art, i.e. between $f_1$=HPMinΔE, $f_2$=CUSP and $f_3$=SCLIP. First, $I_{highM}$ is added to $I_{lowM}$ and the 3 mappings $f_n$, n ∈ {1, 2, 3}, are run (see FIG. 5). Then for each mapping the difference $I_{high\_nM}$ between the result of the mapping and $I_{lowM}$ is computed. This difference can be regarded as the result of the mapping of $_{IhighM}$:

$$I_{high\_nM} = f_n(I_{lowM} + I_{highM}) - I_{lowM}, \; n \in \{1, 2, 3\}.$$

In $I_{high}$ we compute the energy $E^i_{high}$ corresponding to the weighted sum of the norms of $p^j_{high}$ for pixels j in the neighborhood of the pixel i, and similarly the energy $E^i_n$ in each $I_{high\_n}$:

$$E^i_{high} = \sum_{j \in I_{in}} w^j_{BF} \|p^j_{high}\|$$

$$E^i_n = \sum_{j \in I_{in}} w^j_{BF} \|p^j_E\|$$

where $w^j_{BF}$ are the weights of the bilateral filter used in the decomposition of the image. Because the process is scanning the image pixel by pixel, some pixels $p^j_{out}$ of the neighborhood have been already processed. For these pixels, $p^j_{high\_nM}$ are replaced by results $p^j_{out}$ in the computation of $E^i_n$:

$$p^j_E = \begin{cases} p^j_{\overline{high\_n}} & \text{For unprocessed pixels,} \\ p^j_{out} & \text{otherwise} \end{cases}$$

Therefore, anterior decisions are taken into account and Iout depends on the processing order of the pixels. Error diffusion halftoning algorithms have a similar approach. Other options involving optimization tools are possible.

Then the direction of projection for which $E^i_n$ is the closest to $E^i_{high}$ is selected for the pixel i:

$$p^i_{out} = f_{select}(p^i_{low} + p^i_{high}),$$

select=$argmin_n(|E^i_n - E^i_{high}|)$, n ∈ {1,2,3}.

Modified Energy Minimization in SCACLIP

In a variant of the above embodiment, SCACLIP is further optimized by changing the mathematical expression of the energy to preserve. $I_{highM}$ and $I_{lowM}$ are merged and the 3 mappings $f_n$, n ∈ {1, 2, 3}, are run:

$$I_{fn} = f_n(I_{lowM} + I_{highM}), \; n \in \{1,2,3\}.$$

In this variant of SCACLIP, the energy is defined as follows:

$$E^i_n = \sum_{j \in I_{in}} w^j_{BF} \|(p^j_{fn} - p^i_{fn}) - \alpha^i \cdot (p^j_{in} - p^i_{in})\|$$

We apply here the same reduction α to $I_{in}$ as defined before for $I_{high}$ to compensate for the possible reduction of local energy of $I_{lowM}$ compared to $I_{lowM}$. The main improvement in this new definition of the energy is that we take into account the direction of the local color variations within a neighborhood while the energy in the original second embodiment took only into account the amplitude of these variations.

Figure 6:
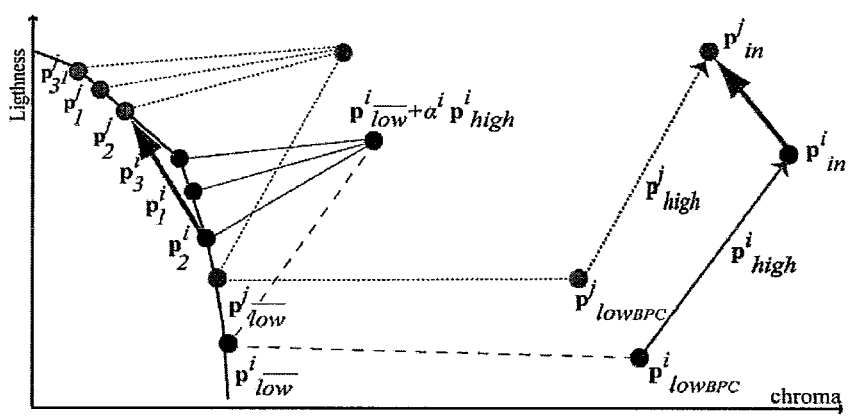
FIG. 6 shows an improvement of a mapping.

Then the direction of projection for which $E^i_n$ is the smallest is selected for the pixel i (see FIG. 6):

select=$argmin_n(E^i_n)$, n ∈ {1, 2, 3}, $$p^i_{out} = f_{select}(p^i_{lowM} + p^i_{highM}).$$

The proposed variant has as advantage that the local differences between the original image and the resulting image are better minimized.

In comparing the new SCAGMA's as proposed above with SCAGMAs known in the art, the following is noted:
  In the system and method presented herein an edge-preserving filter to decompose the image is used. This filter allows to avoid halos. More particular a 5D Bilateral Filter is applied to $I_{in}$—GMA($I_{in}$) to form thigh which is then simply added to GMA($I_{in}$).

According to the proposed embodiment edge preserving multiscale decomposition with an adaptive adjustment of Ihigh obtained with function k( ) is used. This overcomes drawbacks of the prior art, such as:
(a) an adaptive adjustment in a Gaussian based multilevel decomposition would not avoid halos,
(b) an adjustment in the Zolliker and Simon SGMA would result in unbalanced frequency content in the image.

According to the proposed embodiment the method uses a locally adaptive function k( ). In the prior art only a function k( ) with constant scaling is known.

According to the proposed embodiment a locally adaptive mapping (SCACLIP) is provided which compares several mapping alternatives and minimizes the distortion of the local color differences within the input image through the computation of energies.

Advantage is that the frequency content in the resulting image is similar in image regions that are in the destination gamut $Gamut_{Dest}$ and those that are outside it. SGMAs known in the prior art fail on this.

Both embodiments SCACOMP and SCACLIP. presented above, are built on the same framework and therefore have a similar behavior. Yet some differences can be noticed between their output images. In the following we consider these differences, then compare the two algorithms with alternative existing GMAs. Tests have been carried out to evaluate the quality of the output images.

Images produced by SCACOMP are perceived as slightly less saturated and less sharp than SCACLIP but are more likely to be free of artifacts. The differences between the algorithms lead to the differences in the output images:

The initial mapping is different: HPMinΔE in SCACLIP versus SCLIP in SCA-COMP. This difference impacts perceived saturation of resulting images.

Ending adaptive mapping is different and the local contrast in SCACLIP output images is better preserved than in SCACOMP output images. Furthermore, SCACLIP is more likely to present local artifacts because of the limit to three possible directions. This limit can cause a sudden switch from one color to another in smoothly varying areas that might cause noticeable artifacts.

The difference between the resulting images is attenuated when BPC is applied prior to the mapping of $I_{low}$ in the workflow.

This concludes the explanation of step S7 of the method as presented in FIG. 2.

Finally in step S8 conversion takes place of Iout to the CMYK encoding of the output printer using the relative colorometric intent of its ICC profile.

The proposed gamut mapping algorithms is particularly useful for high quality rendering of images captured by a scanner or a digital camera.

A next invention is now described with reference to FIG. 7. The proposed Content Adapted Mapping algorithm is related to the gamut expansion topic. In the prior art it is known that the gamut expansion algorithms perform the enhancement on source gamuts that are smaller than the destination gamut. The Adapted Mapping considers wide gamut images such as satellite images with legends. Indeed, legends in satellite images contain saturated colors, which lead to a wider gamut than the printer gamut. For these particular images, we perform a gamut expansion algorithm that doesn't change the chroma of the pixels that are out of the printer gamut, and that perform the expansion of the pixels within the gamut of the printer.

Each chroma $C_0$ of the source image is mapped to the chroma $C_1$ by using a non linear mapping function. The gamut expansion is performed without changing the luminance and the hue values. Indeed, if at $L_0$ (the luminance of the pixel whose chroma is $C_0$) the maximum chroma value of the printer gamut is $C_{0m}$; the normalized value $C_N = C_0/C_{0m}$ is mapped using the following non linear function:

$$\begin{cases} f(C_N) = C_N \text{ for } 0 \le C_N \le C_p \\ f(C_N) = C_p + \left(\frac{C_N - C_p}{1 - C_p}\right)^\gamma \times (1 - C_p) \text{ for } C_p < C_N \le 1, \end{cases}$$

where gamma is a constant representing the degree of nonlinearity (gamma <1) and $C_p$ is the minimum chroma value from which chroma values are expanded, $$0 = < C_p = < 1.$$

The enhanced chroma $C_1$ is then obtained by:

$$C_1 = f(C_N) \cdot C_{0m} \text{ for } 0 \le C_N \le 1.$$

The advantage of this method is that unsaturated colors have their chroma value enhanced while too saturated colors that are out of the destination gamut remain unchanged.

This Adapted Mapping process is illustrated in FIG. 7. The adapted mapping algorithm applied with $C_p$=0.2 and gamma=0.7 gives the results shown in the satellite pictures. The enhanced image (B) shows more details than the original (A) thanks to the increase of saturation. The increase of saturation performed by the adapted mapping depend on the values chosen for the two parameter values gamma and Cp.

The proposed adapted mapping can be applied to satellite images with labels and globally unsaturated images that contain just few saturated colors which induce wider gamuts than the printer gamut.

Figure 8:
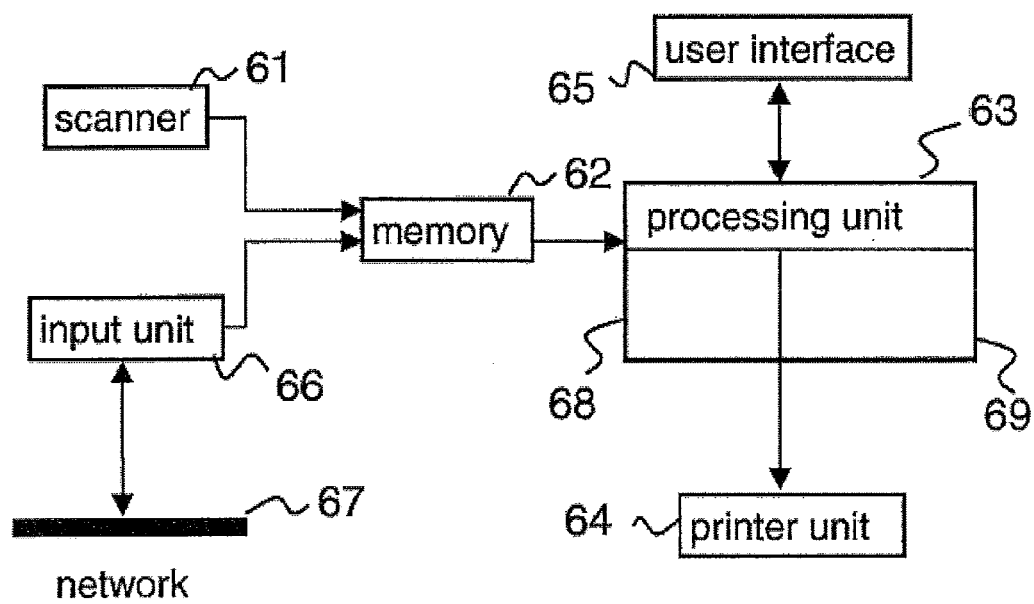
FIG. 8 is a simplified component diagram of a printing apparatus for use in connection with the invention.

FIG. 8 shows a diagrammatic representation of the most important parts of a digital printer in which the invention as described above is applied. This apparatus is provided with a user interface 65 and an input unit 66 for receiving digital images made elsewhere, e.g. via a network 67, so that the apparatus is used as a printer.

The apparatus is also provided with a scanner 61 having a device for transforming a recorded image (for example a photograph) to a digital image, a memory 62 for storing the digital image, a processing unit 63 for processing the digital image and a printing unit 64 for printing the processed digital image on paper or any suitable medium. The apparatus is also suited for use as a photocopier. For printing digital color images, the printing unit 64 contains a number of color printing sub-units, each printing a basis color. For example four color printing sub-units use the basis colorants cyan, yellow, magenta and black in the form of ink or toner. Colors are rendered with raster techniques such as dithering or error diffusion.

The input image originating from the scanner 61 or the input unit 66 is a color image of which the color values are to be transformed according to an embodiment of the invention. The input unit can be used to input image data of a photograph taken elsewhere by digital recording camera. To make a print, the processing unit 63 is provided with means to carry out the method according to the invention.

The processing unit 63 is connected to the operating unit 65, being a user interface. The operator interface 65 is provided with setting means for manually setting parameters of the gamut mapping function, for example by means of a slide or button.

When the invention is used in a printer in a network environment, the user can, for example, indicate by means of the printer driver at his workstation that a color image must be transformed according to his preferences and then printed taking into account desired values for the parameters. In that case, a processing device in the printer transforms the digital color image to a digital color image mapped on the destination gamut according to the invention, and prints the transformed image.

The transformed image may also be displayed on the display unit 68 for a visual control of the result of the transformation.

It is also possible to carry out steps of the gamut mapping method in a separate computer, for example the workstation of a user, and then send intermediate images to a printer, where additional steps for completing the mapping will be carried out, or to a mass memory for storage and later printing.

Figure 9:
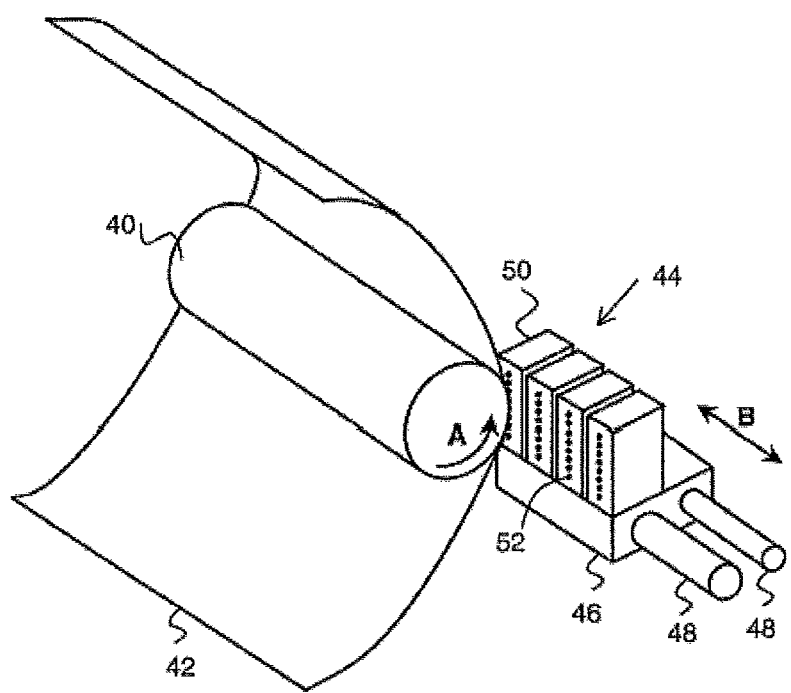
FIG. 9 is a diagram showing essential parts of an ink jet printer to which the invention is applicable.

Rendering the image can be performed in a printing apparatus as the one shown partly in FIG. 9. As is shown therein, an ink jet printer comprises a platen 40 driven for rotation in the direction of an arrow A for transporting a paper sheet 42 which serves as an image recording medium. A printhead 44 is mounted on a carriage 46 which is guided on guide rails 48 and travels back and forth in the direction of an arrow B along the platen 40 so as to scan the paper sheet 42. The printhead 44 comprises four nozzle heads 50, one for each of the basic colors yellow, magenta, cyan and black. An ink is supplied to a nozzle head 50 from an ink container (not shown) through a pipe. On the side facing the sheet 42, each nozzle head 50 has a linear array of nozzles 52. The nozzle heads 50 are energized in accordance with image information of an image to be printed on the sheet 42. Signals are transmitted to the printhead 44 through a connector (not shown) mounted on the carriage 46. Signals in accordance with print data arise from a control unit connected to the printhead 44 through a connector (not shown). Each nozzle 52 can be energized separately so as to eject an ink droplet which will form a dot at a corresponding pixel position on the sheet 42. Thus, when the printhead 44 performs a single stroke along the platen 40, each nozzle 52 can be energized to draw a single pixel line of the intended image. As a result, during each forward or backward stroke of the carriage 46, the printhead 44 will print a swath or band of the image, and the number of pixels lines of the swath will correspond to the number of nozzles 52 present in each nozzle array. Although only eight nozzles 52 are shown per nozzle head 50 in FIG. 9, in practice, the number of nozzles is considerably larger.

Transformation of the captured image data may be required to obtain images rendered with an enhanced colors quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for mapping an original image from a source gamut color subspace to a destination gamut color subspace belonging to a certain output device and having a certain black point, the method comprising the step of:

carrying out black point compensation, the step of black point compensation being adaptive by, in dependence on a characteristic of the image and the black point of the output device, carrying out black point compensation, if a value of the characteristic is more than a first threshold, and carrying out no black point compensation, if the value of the characteristic is less than or equal to the first threshold.

2. The method according to claim 1, wherein the characteristic is a histogram of the image and the value of the characteristic is the number of pixels below the black point of the output device.

3. The method according to claim 2, wherein the step of carrying out black point compensation, if the number of pixels below the black point of the output device is more than a first threshold further comprises the steps of:

carrying out partial black point compensation, if the number of pixels below the black point of the output device is between the first and a second threshold; and carrying out full black point compensation, if the number of pixels below the black point is more than the second threshold.

4. The method according to claim 1, further comprising the steps of decomposing the image in images in several bands, resulting in at least a low pass image, where the step of black point compensation is carried out on the low pass image resulting in a black point compensated low pass image; and applying gamut mapping on the black point compensated low pass image.

5. A system for mapping an original image from a source gamut color subspace to a destination gamut color subspace belonging to a certain output device and having a certain black point, comprising:

a filter for decomposing the original image in several bands, yielding at least a low pass image and a high pass image;

a black point compensation component, taking the low pass image as input and delivering a black point compensated low pass image as output, wherein the black point compensation component is configured to adaptively apply a black point compensation to the low pass image in dependence on a characteristic of the low pass image and the black point of the output device; and an adaptive merging and mapping component for merging and mapping the black point compensated low pass image and the high pass image yielding an output image.

6. The system according to claim 5, wherein the black point compensation component is controlled by a first threshold and a second threshold, the system comprising a user interface for setting the first threshold and second threshold by an operator.

7. The system according claim 5, further comprising an output device for outputting the output image.

8. The system according to claim 7, wherein the output device is an inkjet printing system.

9. The system according to claim 7, wherein the output device a display system.

10. The method according to claim 2, further comprising the steps of decomposing the image in images in several bands, resulting in at least a low pass image, where the step of black point compensation is carried out on the low pass image resulting in a black point compensated low pass image; and applying gamut mapping on the black point compensated low pass image.

11. The method according to claim 3, further comprising the steps of decomposing the image in images in several bands, resulting in at least a low pass image, where the step of black point compensation is carried out on the low pass image resulting in a black point compensated low pass image; and applying gamut mapping on the black point compensated low pass image.

12. The system according to claim 6, further comprising an output device for outputting the output image.

13. A computer program embodied on a non-transitory computer readable medium having computer-executable program code instructions stored therein, the computer-executable program code instructions being configured to, when executed on a computer, cause the computer to execute a method for mapping an original image from a source gamut color subspace to a destination gamut color subspace, the method comprising the step of carrying out black point compensation, the step of black point compensation being adaptive by, in dependence on a characteristic of the image and the black point of the output device, carrying out black point compensation, if a value of the characteristic is more than a first threshold, and carrying out no black point compensation, if the value of the characteristic is less than or equal to the first threshold.

14. The computer program according to claim 13, wherein the characteristic is a histogram of the image and the value of the characteristic is the number of pixels below the black point of the output device 2.

15. The computer program according to claim 13, wherein the step of carrying out black point compensation, if the number of pixels below the black point of the output device is more than a first threshold, further comprises the steps of:

carrying out partial black point compensation, if the number of pixels below the black point of the output device is between the first and a second threshold; and carrying out full black point compensation, if the number of pixels below the black point is more than the second threshold.

16. The computer program according to claim 13, wherein the method further comprises the steps of decomposing the image in images in several bands, resulting in at least a low pass image, where the step of black point compensation is carried out on the low pass image resulting in black point compensated low pass image; and applying gamut mapping on the black point compensated low pass image.

* * * * *